(12) United States Patent
Wang

(10) Patent No.: US 8,953,584 B1
(45) Date of Patent: Feb. 10, 2015

(54) METHODS AND APPARATUS FOR ACCESSING ROUTE INFORMATION IN A DISTRIBUTED SWITCH

(75) Inventor: Hexin Wang, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 303 days.

(21) Appl. No.: 13/488,651

(22) Filed: Jun. 5, 2012

(51) Int. Cl.
*H04L 12/56* (2006.01)

(52) U.S. Cl.
USPC .......................... 370/352; 370/235; 370/419

(58) Field of Classification Search
CPC .................................................. H04L 12/2409
USPC .................................................. 370/253, 419
See application file for complete search history.

(56) References Cited

U.S. PATENT DOCUMENTS

| | | | |
|---|---|---|---|
| 5,049,873 A | 9/1991 | Robins et al. | |
| 6,650,909 B1 * | 11/2003 | Naqvi et al. | 455/560 |
| 7,003,692 B1 | 2/2006 | Banks et al. | |
| 7,194,661 B1 * | 3/2007 | Payson | 714/43 |
| 7,221,650 B1 * | 5/2007 | Cooper et al. | 370/236 |
| 7,225,244 B2 * | 5/2007 | Reynolds et al. | 709/223 |
| 7,525,973 B1 * | 4/2009 | McRae | 370/396 |
| 7,827,317 B2 | 11/2010 | Baldwin et al. | |
| 7,940,695 B1 * | 5/2011 | Bahadur et al. | 370/254 |
| 8,364,852 B1 * | 1/2013 | Shukla et al. | 710/3 |
| 8,472,346 B1 * | 6/2013 | Bahadur et al. | 370/254 |
| 8,615,015 B1 * | 12/2013 | Shekhar | 370/400 |
| 2002/0120741 A1 * | 8/2002 | Webb et al. | 709/225 |
| 2002/0191539 A1 * | 12/2002 | Rawlins et al. | 370/229 |
| 2003/0233583 A1 * | 12/2003 | Carley | 713/201 |
| 2004/0085908 A1 * | 5/2004 | Balasubramanian et al. | 370/252 |
| 2004/0090964 A1 * | 5/2004 | Reed et al. | 370/395.4 |
| 2005/0100340 A1 * | 5/2005 | Nishimura | 398/135 |
| 2006/0206609 A1 * | 9/2006 | Ganesan et al. | 709/226 |
| 2007/0162595 A1 | 7/2007 | Samprathi | |
| 2007/0165659 A1 * | 7/2007 | Yasuda et al. | 370/404 |
| 2009/0037550 A1 * | 2/2009 | Mishra et al. | 709/208 |
| 2009/0059799 A1 * | 3/2009 | Friskney et al. | 370/241.1 |
| 2009/0252063 A1 * | 10/2009 | Owen et al. | 370/255 |
| 2010/0061240 A1 * | 3/2010 | Sindhu et al. | 370/235 |
| 2010/0061241 A1 * | 3/2010 | Sindhu et al. | 370/235 |
| 2010/0061242 A1 * | 3/2010 | Sindhu et al. | 370/235 |
| 2010/0061367 A1 * | 3/2010 | Sindhu et al. | 370/389 |
| 2010/0061389 A1 * | 3/2010 | Sindhu et al. | 370/412 |
| 2010/0061391 A1 * | 3/2010 | Sindhu et al. | 370/412 |
| 2010/0061394 A1 * | 3/2010 | Sindhu et al. | 370/422 |
| 2010/0097926 A1 * | 4/2010 | Huang et al. | 370/219 |
| 2010/0103837 A1 * | 4/2010 | Jungck et al. | 370/252 |
| 2010/0165876 A1 * | 7/2010 | Shukla et al. | 370/254 |

(Continued)

*Primary Examiner* — Khaled Kassim
*Assistant Examiner* — Parth Patel
(74) *Attorney, Agent, or Firm* — Cooley LLP

(57) ABSTRACT

In some embodiments, a non-transitory processor-readable medium includes code to cause a processor to receive, at a network management module, a request for data plane information associated with a set of access switches of a distributed switch. The non-transitory processor-readable medium includes code to cause the processor to send, in response to the request, an instruction to each access switch from the set of access switches such that a proxy module at each access switch accesses data plane information at at least one line card at that access switch. The non-transitory processor-readable medium includes code to cause the processor to receive, from each access switch from the set of access switches, the data plane information associated with that access switch, and then send a signal to output, on a single interface, the data plane information associated with each access switch from the set of access switches.

19 Claims, 5 Drawing Sheets

(56) References Cited

U.S. PATENT DOCUMENTS

| | | | |
|---|---|---|---|
| 2010/0290446 A1* | 11/2010 | Atreya et al. | 370/338 |
| 2011/0103259 A1* | 5/2011 | Aybay et al. | 370/254 |
| 2011/0302346 A1* | 12/2011 | Vahdat et al. | 710/301 |
| 2013/0031230 A1* | 1/2013 | Ainsworth et al. | 709/223 |
| 2013/0070761 A1* | 3/2013 | Kamble et al. | 370/389 |
| 2013/0083793 A1* | 4/2013 | Lea | 370/388 |
| 2013/0332577 A1* | 12/2013 | Nakil et al. | 709/219 |

\* cited by examiner

METHODS AND APPARATUS FOR ACCESSING ROUTE INFORMATION IN A DISTRIBUTED SWITCH

BACKGROUND

Some embodiments described herein relate generally to distributed switch fabrics, and, in particular, to methods and apparatus for accessing and retrieving information in a distributed switch fabric.

In some known distributed switch fabrics (e.g., a switch fabric within a data center), to debug a target agent (e.g., a packet forwarding engine (PFE) daemon) on a target node (e.g., an access switch) or retrieve information from a target agent on a target node, multiple steps of operations are typically used to reach the target agent on the target node and access the information. In such known distributed switch fabrics, the same operations of the multiple steps are typically repeated to reach and access multiple nodes for debugging or retrieving information. For example, scripts can be used to repeat the same operations of the multiple steps to access and retrieve information from PFE daemons on multiple line cards of multiple nodes in a distributed switch fabric. Such an approach, however, is typically complex, tedious, and difficult to scale for a distributed switch fabric with a large number of nodes.

Accordingly, a need exists for methods and apparatus that can simplify the multiple steps of operations to more efficiently access and retrieve information from multiple nodes of a distributed switch fabric.

SUMMARY

In some embodiments, a non-transitory processor-readable medium includes code to cause a processor to receive, at a network management module, a request for data plane information associated with a set of access switches of a distributed switch. The non-transitory processor-readable medium includes code to cause the processor to send, in response to the request, an instruction to each access switch from the set of access switches such that a proxy module at each access switch accesses data plane information at at least one line card at that access switch. The non-transitory processor-readable medium includes code to cause the processor to receive, from each access switch from the set of access switches, the data plane information associated with that access switch, and then send a signal to output, on a single interface, the data plane information associated with each access switch from the set of access switches.

DETAILED DESCRIPTION

Figure 1:
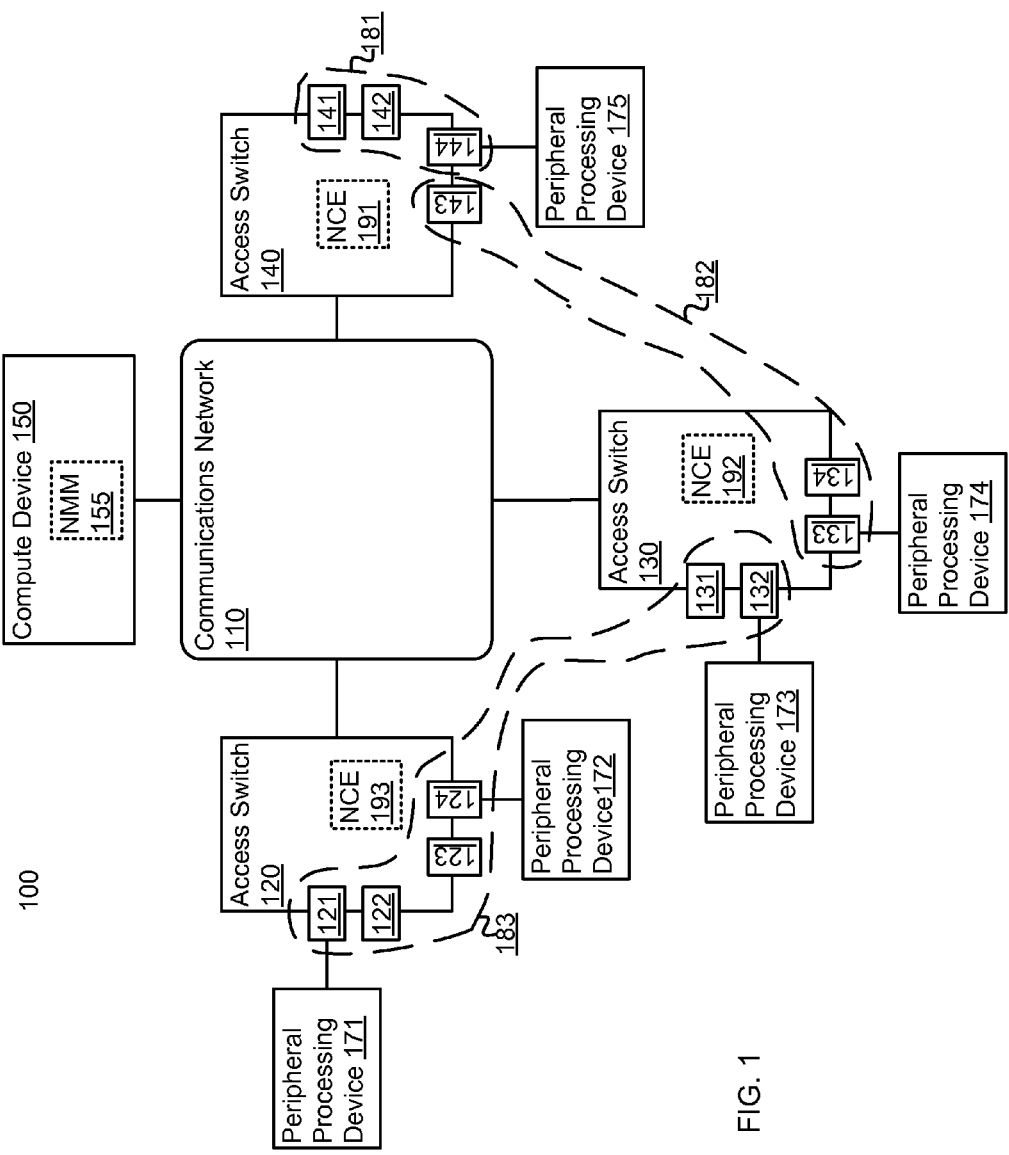
FIG. 1 is a schematic illustration of a switch fabric system, according to an embodiment.

In some embodiments, a non-transitory processor-readable medium stores code representing instructions to be executed by a processor. The code stored in the non-transitory processor-readable medium includes code to cause the processor to receive, at a network management module, a request for data plane information associated with a set of access switches of a distributed switch. The non-transitory processor-readable medium includes code to cause the processor to send, in response to the request, an instruction to each access switch from the set of access switches such that a proxy module at each access switch from the set of access switches accesses data plane information at one or more line cards at that access switch.

The non-transitory processor-readable medium also includes code to cause the processor to receive, from each access switch from the set of access switches, the data plane information associated with that access switch. The non-transitory processor-readable medium further includes code to cause the processor to send a signal to output, on a single interface, the data plane information associated with each access switch from the set of access switches.

In some embodiments, the non-transitory processor-readable medium includes code to cause the processor to access control plane data stored at the network management module. Furthermore, the non-transitory processor-readable medium includes code to cause the processor to send the signal to output the control plane data on the single interface with the data plane information associated with each access switch from the set of access switches.

In some embodiments, the non-transitory processor-readable medium includes code to cause the processor to receive, at the network management module, a request for system state information. The non-transitory processor-readable medium includes code to cause the processor to send, in response to the request for system state information, an instruction to each network control entity from a set of network control entities. The non-transitory processor-readable medium also includes code to cause the processor to receive system state information from each network control entity from the set of network control entities. The non-transitory processor-readable medium further includes code to cause the processor to send the signal to output the system state information from each network control entity from the set of network control entities on the single interface with the data plane information associated with each access switch from the set of access switches.

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

As used herein, the singular forms "a," "an" and "the" include plural referents unless the context clearly dictates otherwise. Thus, for example, the term "a compute device" is intended to mean a single compute device or a combination of compute devices (e.g., devices associated with a computing and managing function).

FIG. 1 is a schematic illustration of a switch fabric system 100, according to an embodiment. The switch fabric system 100 includes a communications network 110; multiple access switches 120, 130, 140, which include network control entities (NCE) 193-191, respectively; a compute device 150, which includes a network management module (NMM) 155; and multiple peripheral processing devices 171-175. The communications network 110 can be any suitable communications network that operatively couples the access switches 120, 130 and 140 to the other access switches 120, 130 and

140. Additionally, the communications network 110 can operatively couple the compute device 150 to the access switches 120, 130, 140. In some embodiments, the communications network 110 includes a data plane portion and a control plane portion.

The data plane portion of the communications network 110 facilitates transmission of data (e.g., data packets, data cells) associated with the data plane of the switch fabric system 100 between the access switches 120, 130, 140. In some embodiments, the data plane portion of the communications network 110 can be a distributed switch fabric having one or more stages that operatively couples the access switches 191-193 to the compute device 150 via one or multiple data paths. For example, the data plane portion of the communications network 110 can be a Clos switch fabric network (e.g., a non-blocking Clos network, a strict sense non-blocking Clos network, a Benes network) having multiple stages of switch modules (e.g., integrated Ethernet switches). Such a distributed switch fabric can include any number of stages. In some embodiments, for example, the switch fabric can include three, five, seven or nine stages. In some embodiments, the data plane portion of the communications network 110 can be, for example, part of a core portion of a data center fabric (DCF).

In some embodiments, the data plane portion of the communications network 110 can be (e.g., can function as) a single consolidated switch (e.g., a single large-scale consolidated layer 2 (L2) or layer 3 (L3) switch). In other words, the data plane portion of the communications network 110 can operate as a single logical entity (e.g., a single logical network element). Similarly stated, the data plane portion of the communications network 110 can be part of a single logical hop between a first access switch 120, 130 or 140 and a second access switch 120, 130 or 140 (e.g., along with the data paths between the access switches 120, 130, 140 and the communications network 110). The data plane portion of the communications network 110 can operatively couple (e.g., indirectly connect, facilitate communication between) the peripheral processing devices 171-175. In some embodiments, the communications network 110 can communicate with the access switches 120, 130, 140 via interface devices (not shown in FIG. 1) operable to transmit data at a rate of at least 10 Gb/s. In some embodiments, the communications network 110 can communicate with the access switches 120, 130, 140 via interface devices (e.g., Fibre-Channel interface devices) operable to transmit data at a rate of, for example, 2 Gb/s, 4 Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis (or racks). In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

The control plane portion of the communications network 110 facilitates transmission of control signals (e.g., configuration information, route information, etc.) between the network control entities 191-193 and the network management module 155. As described in further detail herein, signals and/or information associated with the network control entities 191-193 such as, for example, signals to retrieve data plane information, control plane data, system state information, etc., can be transmitted between the network control entities 191-193 and the network management module 155 via the control plane portion of the communications network 110. In some embodiments, the control plane portion of the communications network 110 includes direct links between the network management module 155 and the network control entities 191-193. In some other embodiments, the control plane portion of the communications network 110 includes intermediate modules and/or switches (e.g., not shown in FIG. 1) to operatively couple the network management module 155 with the network control entities 191-193.

Figure 2:
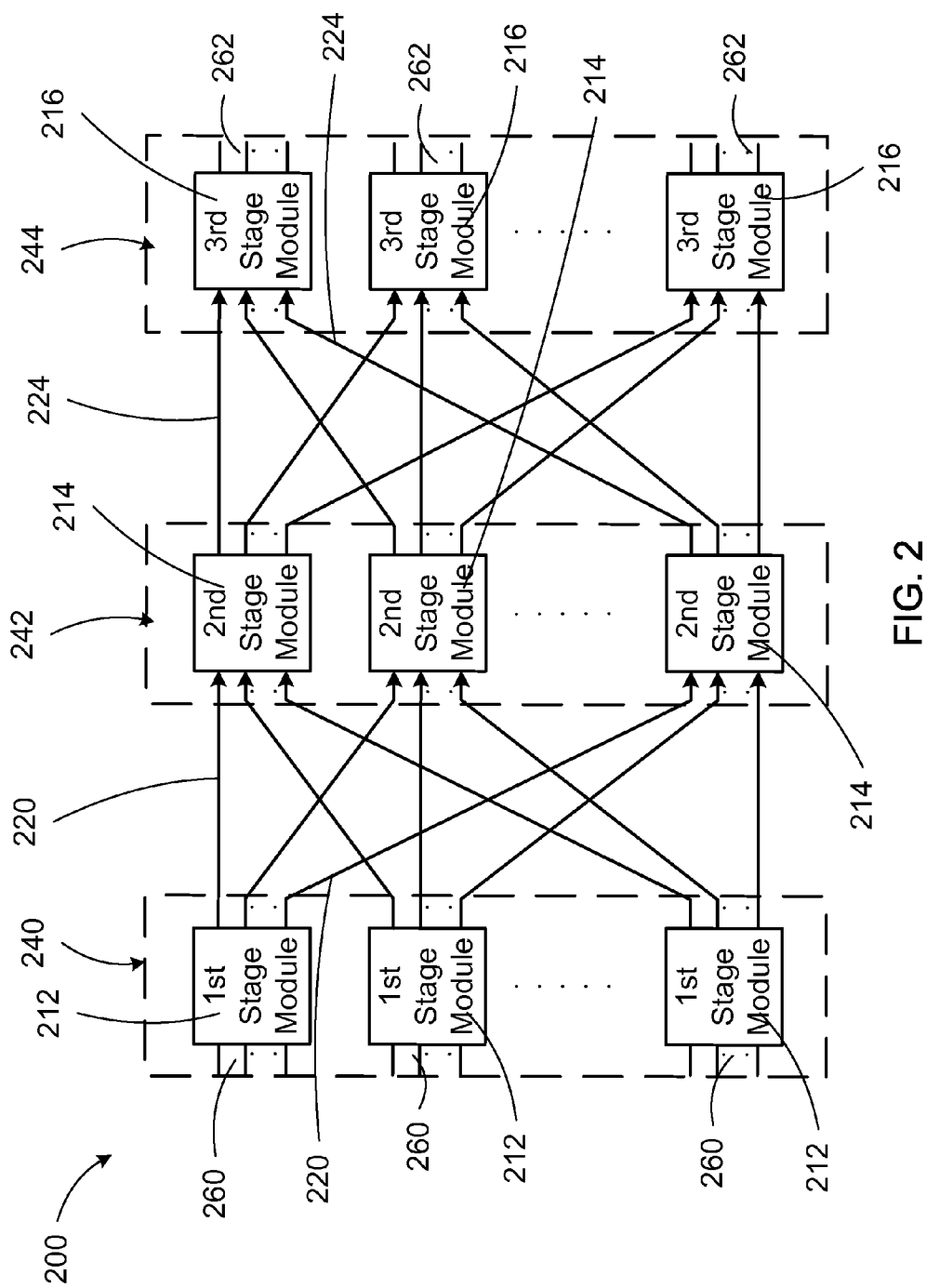
FIG. 2 is a schematic illustration of a multi-stage switch fabric, according to an embodiment.

FIG. 2 is a schematic illustration of a multi-stage switch fabric 200, according to an embodiment. The switch fabric 200 can be structurally and functionally similar to the distributed switch fabric associated with the communications network 110 shown and described with respect to FIG. 1. The switch fabric 200 can include multiple physical hops that are within a single logical hop. In some embodiments, the switch fabric 200 can be a multi-stage, non-blocking Clos network that includes a first stage 240, a second stage 242, and a third stage 244. The first stage 240 includes switch modules 212; the second stage 242 includes switch modules 214; the third stage 244 includes switch modules 216. Said another way, switch modules 212 of the first stage 240, switch modules 214 of the second stage 242 and switch modules 216 of the third stage 244 collectively define the multi-stage switch fabric 200.

In some embodiments, each switch module 212 of the first stage 240 can be an assembly of electronic components and circuitry. In some embodiments, for example, each switch module 212 is an application specific integrated circuit (ASIC). In other embodiments, multiple switch modules 212 are contained on a single ASIC or a single chip package. In still other embodiments, each switch module 212 is an assembly of discrete electrical components.

In some embodiments, each switch module 212 of the first stage 240 can be a switch (e.g., a packet switch, a frame switch, an integrated Ethernet switch and/or a cell switch). The switches are configured to redirect data (e.g., data packets, data cells, etc.) as the data flows through the switch fabric 200. In some embodiments, for example, each switch includes multiple ingress ports operatively coupled to write interfaces on a memory buffer (not shown in FIG. 2). Similarly, a set of egress ports are operatively coupled to read interfaces on the memory buffer. In some embodiments, the memory buffer can be a shared memory buffer implemented using on-chip static random access memory (SRAM) to provide sufficient bandwidth for all ingress ports to write one incoming data cell (e.g., a portion of a data packet) or data packet per time period (e.g., one or more clock cycles) and for all egress ports to read one outgoing data cell or data packet per time period. Each switch operates similarly to a crossbar switch that can be reconfigured in subsequent each time period.

Each switch module 212 of the first stage 240 includes a set of ingress ports 260 configured to receive data (e.g., a data cell, a data packet) as the data enters the switch fabric 200. For example, each ingress port 260 can be coupled to a device (e.g., the access switches 120, 130, 140 and the compute device 150 shown and described with respect to FIG. 1). In some embodiments, more than one ingress port 260 of a switch module 212 can be coupled to different ports of a common device via separate physical connections (e.g., multiple electrical cables, multiple fiber-optic cables, etc.). Accordingly, the device coupled to the ingress ports 260 can send data to the switch fabric 200 via the ingress ports 260. In the embodiment of FIG. 2, each switch module 212 of the first stage 240 includes the same number of ingress ports 260. In other embodiments, each switch module 212 can have different numbers of ingress ports 260.

Similar to the first stage 240, the second stage 242 of the switch fabric 200 includes switch modules 214. The switch modules 214 of the second stage 242 are structurally similar to the switch modules 212 of the first stage 240. In some embodiments, each switch module 214 of the second stage 242 is operatively coupled to each switch module 212 of the first stage 240 by a data path 220. Each data path 220 between a given switch module 212 of the first stage 240 and a given switch module 214 of the second stage 242 is configured to facilitate data transfer from the switch modules 212 of the first stage 240 to the switch modules 214 of the second stage 242.

The data paths 220 between the switch modules 212 of the first stage 240 and the switch modules 214 of the second stage 242 can be constructed in any manner configured to facilitate data transfer from the switch modules 212 of the first stage 240 to the switch modules 214 of the second stage 242. In some embodiments, for example, the data paths 220 can be, for example, optical connectors between the switch modules. In other embodiments, the data paths 220 can be, for example, within a midplane. Such a midplane can be used to connect each switch module 214 of the second stage 242 with each switch module 212 of the first stage 240. In still other embodiments, two or more switch modules 212 and 214 can be contained within a single chip package and the data paths 220 can be electrical traces.

In some embodiments, the switch fabric 200 can be a non-blocking Clos network. Thus, the number of switch modules 214 of the second stage 242 of the switch fabric 200 varies based on the number of the ingress ports 260 of each switch module 212 of the first stage 240. In a rearrangeably non-blocking Clos network (e.g., a Benes network), the number of switch modules 214 of the second stage 242 is greater than or equal to the number of the ingress ports 260 of each switch module 212 of the first stage 240. In some embodiments, for example, each switch module 212 of the first stage 240 has five ingress ports 260. Thus, the second stage 242 has at least five switch modules 214. In some embodiments, each of the switch modules 212 of the first stage 240 is operatively coupled to all the switch modules 214 of the second stage 242 by data paths 220. Said another way, each switch module 212 of the first stage 240 can send data to any switch module 214 of the second stage 242.

The third stage 244 of the switch fabric 200 includes switch modules 216. The switch modules 216 of the third stage 244 are structurally similar to the switch modules 212 of the first stage 240. The number of switch modules 216 of the third stage 244 is typically equivalent to the number of switch modules 212 of the first stage 240. Each switch module 216 of the third stage 244 includes egress ports 262 configured to allow data to exit the switch fabric 200. For example, each egress port 262 can be coupled to a device (e.g., the access switches 120, 130, 140 and the compute device 150 shown and described with respect to FIG. 1). In some embodiments, similar to the switch module 212 of the first stage 240, more than one egress port 262 of a switch module 216 can be coupled to different ports of a common device via separate physical connections (e.g., multiple electrical cables, multiple fiber-optic cables, etc.). Accordingly, the device coupled to the egress ports 262 can receive data from the switch fabric 200 via the egress ports 262. In the embodiment of FIG. 2, each switch module 216 of the third stage 244 includes the same number of egress ports 262. Further, the number of egress ports 262 of each switch module 216 of the third stage 244 is typically equivalent to the number of ingress ports 260 of each switch module 212 of the first stage 240. In other embodiments, each switch module 216 can have different numbers of egress ports 262, and the number of egress ports 262 of a switch module 216 of the third stage 244 can be different from the number of ingress ports 260 of a switch module 212 of the first stage 240.

In some embodiments, each switch module 216 of the third stage 244 can be connected to each switch module 214 of the second stage 242 by a data path 224. The data paths 224 between the switch modules 214 of the second stage 242 and the switch modules 216 of the third stage 244 are configured to facilitate data transfer from the switch modules 214 of the second stage 242 to the switch modules 216 of the third stage 244.

Similar to the data paths 220, the data paths 224 between the switch modules 214 of the second stage 242 and the switch modules 216 of the third stage 244 can be constructed in any manner configured to facilitate data transfer from the switch modules 214 of the second stage 242 to the switch modules 216 of the third stage 244. In some embodiments, for example, the data paths 224 can be, for example, optical connectors between the switch modules. In other embodiments, the data paths 224 can be within a midplane. Such a midplane can be used to connect each switch module 214 of the second stage 242 with each switch module 216 of the third stage 244. In still other embodiments, two or more switch modules 214 and 216 can be contained within a single chip package and the data paths 224 can be electrical traces.

In some embodiments, data can be routed through the switch fabric 200 using hash functions, lookup tables, routing tables and/or the like. For example, a first stage switch module 212 can determine to which second stage switch module 214 to send a data cell by using header values of the data cell as inputs to a hash function. A result of the hash function can be an identifier of a second stage switch module 214 and the first stage switch module 212 can send the data cell accordingly. Similarly, a second stage switch module 214 and/or a third stage switch module 216 can determine to which third stage switch module 216 or to which device coupled to an egress port 262, respectively, to send the data cell, respectively, using such a hash function, a lookup table and/or a routing table.

Returning to FIG. 1, the peripheral processing devices 171-175 are operatively coupled to each other by remaining portions of the switch fabric system 100. The peripheral processing devices 171-175 can be, for example, compute nodes, service nodes, routers, storage nodes, and/or the like. In some embodiments, for example, the peripheral processing devices 171-175 include servers, storage devices, gateways, workstations, and/or the like. The peripheral processing devices 171-175 can be operatively coupled to one or more ports 121-124, 131-134, 141-144 of the access switches 120, 130, 140 using any suitable connection such as, for example, an optical connection (e.g., an optical cable and optical connectors), an electrical connection (e.g., an electrical cable and electrical connectors), a wireless connection (e.g., an access point and a transceiver), and/or the like. Similarly stated, each port 121-124, 131-134, 141-144 provides a communication interface through which a peripheral processing device 171-175 can be operatively coupled to an access switch 120, 130, 140. As such, the peripheral processing devices 171-175 can send data (e.g., data packets, data cells, etc.) to and receive data from the access switches 120, 130, 140. In some embodiments, the connection between the peripheral processing devices 171-175 and the access switches 120, 130, 140 is a direct link. Such a link can be said to be a single physical hop link. In other embodiments, the peripheral processing devices 171-175 can be operatively coupled to the access switches 120, 130, 140 via one or more intermediate modules (not shown in FIG. 1). Such a connection can be said to be a multiple physical hop link.

Each access switch 120, 130, 140 can be any device that operatively couples one or more peripheral processing devices (e.g., the peripheral processing devices 171-175) to the communications network 110. In some embodiments, for example, the access switches 120, 130, 140 can be edge devices, input/output modules, top-of-rack (TOR) devices and/or the like. Structurally, the access switches 120, 130, 140 can function as both source access switches and destination access switches. Accordingly, the access switches 120, 130, 140 can send data (e.g., a data stream of data packets and/or data cells) to and receive data from the communications network 110, and to and from the connected peripheral processing devices 171-175.

Each of the access switches 120, 130, 140 is operable to communicate with the other access switches 120, 130, 140 via the communications network 110 (e.g., within both the data plane portion and the control plane portion of the communications network 110). Specifically, the data plane portion of the communications network 110 provides any-to-any connectivity between the access switches 120, 130, 140 at a relatively low latency. For example, the data plane portion of the communications network 110 can transmit (e.g., convey) data between the access switches 120, 130, 140. In some embodiments, the communications network 110 can have at least hundreds or thousands of ports (e.g., egress ports and/or ingress ports) through which the access switches 120, 130, 140 can transmit and/or receive data.

As shown in FIG. 1, the access switches 120, 130, 140 can host the network control entities 191-193 to manage the ports 121-124, 131-134, 141-144 of the access switches 120, 130, 140. Accordingly, the network control entities 191-193 can be part of a control plane of the switch fabric system 100. Each network control entity 191-193 can be a process, application, virtual machine, and/or some other software module (stored and/or executing in hardware) or a hardware module executed at the access switch 120, 130 or 140. As such, instructions that implement the network control entity 191-193 can be stored within a memory of the access switch 120, 130 or 140 and executed at a processor of the access switch 120, 130 or 140.

Each network control entity 191-193 can manage one or more of the ports 121-124, 131-134, 141-144 of the access switches 120, 130 and 140. For example, as shown in FIG. 1, the network control entity 191 is operable to manage the ports 141, 142 and 144 associated with the group of ports 181; the network control entity 192 is operable to manage the ports 133, 134 and 143 associated with the group of ports 182; the network control entity 193 is operable to manage the ports 121, 122, 123, 124, 131 and 132 associated with the group of ports 183. In some embodiments, each network control entity 191-193 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of ports 181, 182, 183, monitor a state and/or status of peripheral processing devices (e.g., peripheral processing devices 171-175) associated with its group of ports 181, 182, 183, and/or manage and maintain other information associated with the peripheral processing devices and/or ports associated with its group of ports 181, 182, 183, respectively. In some embodiments, each network control entity 191-193 can manage and/or maintain control plane information, data plane information, system state information, and/or other information associated with the peripheral processing devices and/or ports.

In some embodiments, a network control entity can control and/or manage ports at an access switch at which the network control entity is located (e.g., the network control entity 191 manages the group of ports 181). In some other embodiments, a network control entity can also control and/or manage ports at an access switch other than the access switch at which the network control entity is located (e.g., the network control entity 193 manages ports 131 and 132, and the network control entity 192 manages port 143). In such embodiments, the network management module 155 within the compute device 150 has flexibility to assign each of the ports 121-124, 131-134, 141-144 to any of the network control entities 191-193 based on, for example, processing capacity. Additionally, in such embodiments, the network management module 155 is not constrained by the physical locations of the network control entities 191-193 and/or the ports 121-124, 131-134, 141-144 when assigning ports 121-124, 131-134, 141-144 to a network control entity 191-193.

Figure 3:
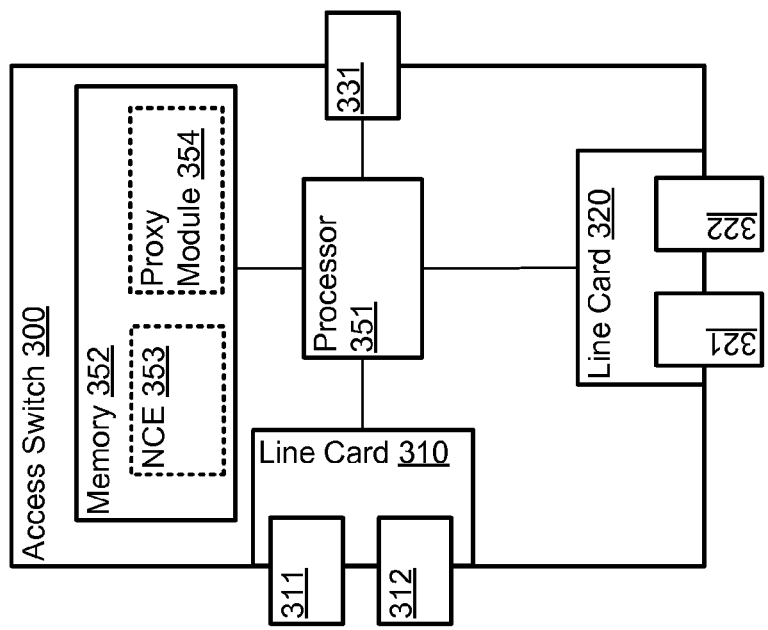
FIG. 3 is a block diagram of an access switch, according to an embodiment.

FIG. 3 is a block diagram of an access switch 300 substantially similar to the access switch 120, 130 or 140 in FIG. 1, according to an embodiment. The access switch 300 includes a processor 351; a memory 352, which includes a network control entity 353 and a proxy module 354; line cards 310, 320; and a port 331. The processor 351 is operatively coupled to the memory 352, the line card 310, the line card 320 and the port 331. The line card 310 includes ports 311 and 312. The line card 320 includes ports 321 and 322. In some embodiments, the line cards 310 and/or 320 can include one or more processors and/or memories.

Similar to the ports 121-124, 131-134, 141-144 of the access switches 120, 130 and 140 shown in FIG. 1, the ports 311, 312, 321 and 322 can communicate with peripheral processing devices (e.g., peripheral processing devices 171-175 in FIG. 1) coupled to the ports 311, 312, 321 and 322. In some embodiments, the ports 311, 312, 321 and 322 can implement a physical layer using, for example, twisted-pair electrical signaling via electrical cables or fiber-optic signaling via fiber-optic cables. In some embodiments, some of the ports 311, 312, 321 and 322 can implement one physical layer using such as twisted-pair electrical signaling and others of the ports 311, 312, 321 and 322 can implement a different physical layer using such as fiber-optic signaling. Furthermore, the ports 311, 312, 321 and 322 can allow the access switch 300 to communicate with the peripheral processing devices (e.g., computer servers) via a common protocol such as Ethernet or Fibre Channel. In some embodiments, some of the ports 311, 312, 321 and 322 can implement one protocol such as Ethernet and others of the ports 311, 312, 321 and 322 can implement a different protocol such as Fibre Channel. Thus, the access switch 300 can be in communication with multiple peripheral processing devices using homogeneous or heterogeneous physical layers and/or protocols via the ports 311, 312, 321 and 322.

The port 331 can be in communication with other access switches via a communications network such as the communications network 110 in FIG. 1. The port 331 can be part of one or more network interfaces (e.g., a 40 Gigabit (Gb) Ethernet interface, a 100 Gb Ethernet interface, etc.) through which the access switch 300 can send signals to and/or receive signals from the communications network. The signals can be sent to and/or received from the communications network via, for example, an electrical link, an optical link, a wireless link and/or the like that is operatively coupled to the access switch 300. In some embodiments, the access switch 300 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, the port 331 can implement a different physical layer and/or protocol than those implemented at the ports 311, 312, 321 and 322. For example, the port 311, 312, 321 and 322 can communicate with the peripheral processing devices using a protocol based on data packets and the port 331 can communicate with the communications network using a protocol based on data cells. Said differently, the access switch 300 can be or function as an edge device of a network switch such as a distributed network switch.

In some embodiments, the access switch 300 can send a control signal to the communications network (e.g., communications network 110), via the port 331, to distribute to other access switches or a compute device(s). The control signal can include protocol information (e.g., route information, configuration information, etc.), data plane information, and/or other information associated with one or a group of ports of the access switch 300. The access switch 300 can also receive such a control signal sent from other access switches or a compute device(s) over the communications network via the port 331.

In some embodiments, the memory 352 can be, for example, a random-access memory (RAM) (e.g., a dynamic RAM, a static RAM), a flash memory, a removable memory, and/or so forth. In some embodiments, instructions that implement the network control entity 353 and the proxy module 354 can be stored within the memory 352 and executed at the processor 351. In some embodiments, the access switch 300 can include a combination of hardware modules and software modules (stored and/or executing in hardware). In some embodiments, for example, the access switch 300 can include a field-programmable gate array (FPGA), an application specific integrated circuit (ASIC), a digital signal processor (DSP) and/or the like.

Similar to the network control entities 191-193 in FIG. 1, the network control entity 353 can be, for example, a process, application, virtual machine, and/or some other software module (stored and/or executing in hardware) or a hardware module configured to manage one or more ports (e.g., the ports 211, 212, 221, 222, 231) of the access switch 300 and/or other access switch(es). For example, the network control entity 353 can manage and/or maintain configuration information (e.g., port protocol information, network segment assignment information, port assignment information, peripheral processing device information, etc.), forwarding-state information (e.g., port identifiers, network segment identifiers, peripheral processing device identifiers, etc.), and/or other information (e.g., data plane information control plane information, system state information, etc.) associated with a group of ports, monitor a state and/or status of peripheral processing devices associated with the group of ports, and/or manage and maintain other information associated with the peripheral processing devices associated with the group of ports.

In some embodiments, the proxy module 354 can be associated with the network control entity 353. As described in detail with respect to FIG. 5, the proxy module 354 can be configured to, among other operations, access and retrieve information stored in a memory location or a component within the access switch 300. In some embodiments, to access and retrieve information from different components or memory locations of the access switch 300, the proxy module 354 can be configured to use different methods or mechanisms (e.g., different login methods, different command types). For example, the proxy module 354 can be configured to access and retrieve information associated with the group of ports (e.g., the ports 311, 312, 321 and 322) from a line card of the access switch 300 using a Virtual Teletype Terminal (VTY) command and a login to that line card. For another example, the proxy module 354 can be configured to access and retrieve information associated with the access switch 300 from a kernel in the memory 352 using a Shell command and a different login to that kernel.

Specifically, for example, in response to receiving a signal requesting data plane information associated with the line card 310 that is managed by the network control entity 353, the proxy module 354 can be configured to access the data plane information from the line card 310 using, for example, a proxy login to the line card 310. That is, the proxy module 354 can be configured to login to the line card 310 using login information stored at the proxy module 354. As a result, the proxy module 354 can be configured to retrieve the requested data plane information from the line card 310. Furthermore, the proxy module 354 can be configured to send the data plane information to, for example, a network management module (e.g., the network management module 155 in FIG. 1) from which the signal is received.

In some embodiments, as an alternative to the approach described above, the network management module can be configured to access and retrieve information from a memory location or a component of the access switch 300 remotely without using a proxy module. In such embodiments, for example, the network management module can be configured to remotely login to the access switch 300, connect to the desired component or memory location of the access switch 300 (e.g., a line card, a port, a kernel), login to that component if necessary, then access and retrieve requested data or information. Each of the above operations can be performed remotely at the network management module under control of, for example, a user associated with the network management module.

In some embodiments, the proxy module 354 can be, for example, a VTY proxy daemon. In such embodiments, the proxy module 354 can be connected to, for example, a device (not shown in FIG. 3) having a command line interface (CLI) associated with a network management module (e.g., the network management module 155 in FIG. 1) that manages the network control entity 353. A user can use the CLI to connect to the proxy module 354 using, for example, the Telnet protocol. In some embodiments, such a proxy module 354 can be used to enable, for example, Telnet, Secure Shell (SSH) and/or File Transfer Protocol (FTP) services for the switch fabric system that includes the access switch 300.

Returning to FIG. 1, the compute device 150 can be any device configured to host and execute management modules, processes and/or functions associated with the switch fabric system 100. As shown in FIG. 1, the compute device 150 can host and execute a network management module 155, which can be part of the control plane of the switch fabric system 100.

The network management module 155 can be a process, application, virtual machine, and/or some other software module (stored and/or executing in hardware) or a hardware module executed at the compute device 150, which is configured to manage the network control entities (e.g., the network control entities 191-193) of the switch fabric system 100. In some embodiments, the network management module 155 can be associated with an interface (e.g., a CLI) that can be accessed and operated by a user to configure, manage, debug and/or retrieve information from the associated network control entities.

In some embodiments, the network manage module 155 can be configured to divide and/or partition the ports 121-124, 131-134, 141-144 of the access switches 120, 130, 140 into the groups of ports 181, 182, 183 to be managed by the network control entities 191-193. As such, the network management module 155 can associate the group of ports 181 with the network control entity 191, the group of ports 182 with the network control entity 192, and the group of ports 183 with the network control entity 193. Additionally, the network management module 155 can monitor an available processing capacity of each network control entity 191-193 and initiate additional and/or terminate existing network control entities 191-193 when the available processing capacity of a network control entity 191-193 crosses (e.g., falls below) a first threshold and/or crosses (e.g., exceeds) a second threshold.

In some embodiments, the network management module 155 can store (e.g., in a memory) control plane information for the switch fabric system 100 such as, for example, a configuration file associated with configuration information (e.g., port protocol information, network segment assignment information, port assignment information, peripheral processing device information, etc.) and/or forwarding-state information (e.g., routing information, port identifiers, network segment identifiers, peripheral processing device identifiers, etc.) of the switch fabric system 100. Furthermore, the network management module 155 can send a portion of the forwarding-state information associated with a respective group of ports 181, 182, 183 to the related network control entities 191-193 via the control plane portion of communications network 110. In some embodiments, as described in detail with respect to FIG. 5, the network management module 155 can be configured to access and retrieve information from the network control entities 191-193. In some embodiments, the network management module 155 can be referred to as a switch fabric controller (SFC).

In some embodiments, the network management module 155 can provide a single point of connectivity of a physical switch spans across multiple network control entities (e.g., the network control entities 191-193) within the switch fabric system 100. Furthermore, in some embodiments, the network management module 155 can provide a single point of connectivity between the switch fabric system 100 and, for example, another switch fabric system and/or switch (not shown in FIG. 1). In such embodiments, for example, the switch fabric system 100 can appear as a single virtual switch to other switch fabric systems and/or switches outside of the switch fabric system 100 and operatively coupled to the switch fabric system 100 via the network management module 155. Additionally, communication between the switch fabric system 100 and another switch fabric system and/or switch can be controlled by the network management module 155.

Figure 4:
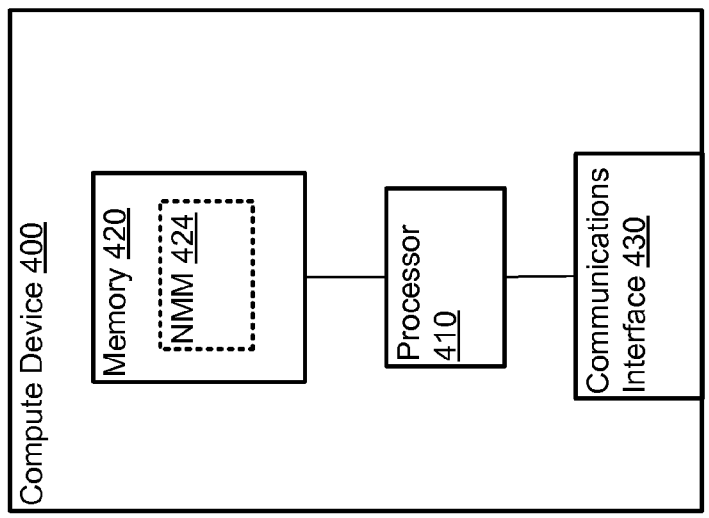
FIG. 4 is a block diagram of a compute device, according to an embodiment.

FIG. 4 is a block diagram of a compute device 400 substantially similar to the compute device 150 in FIG. 1, according to an embodiment. The compute device 400 includes a processor 410; a memory 420, which includes a network management module 424; and a communications interface 430. The processor 410 is operatively coupled to the memory 420 and the communications interface 430. The compute device 400 can communicate with other compute devices, peripheral processing devices and/or access switches via the communications interface 430.

As illustrated in FIG. 4, the compute device 400 can host a network management module 424 similar to the network management module 155 in FIG. 1. The network management module 424 can be a process, application, virtual machine, and/or some other software module (stored and/or executing in hardware) or a hardware module that is executed at the compute device 400. In some embodiments, for example, instructions that implement the network management module 424 can be stored at the memory 420 and executed at the processor 410.

In some embodiments, the memory 420 is and/or includes a non-transitory processor-readable medium that stores code representing instructions to be executed by the processor 410. Some of the instructions executed by the processor 410 can cause the network management module 424 to execute a series of operations with respect to managing, debugging and/or retrieving information from network control entities that are managed by the network management module 424 within a switch fabric system (e.g., the switch fabric system 100 in FIG. 1) that hosts the compute device 400. Managing, debugging and retrieving information in a switch fabric system using a network management module and one or more network control entities is described in further detail below with respect to FIGS. 5-6.

In some embodiments, the compute device 400 can be dedicated to hosting the network management module 424. In other words, the compute device 400 can allocate all or substantially all of its computing resources (e.g., processing capacity and memory) to the network management module 424. In some embodiments, the compute device 400 can host other processes, applications, virtual machines, and/or software modules (stored and executing in hardware) in addition to the network management module 424 such as, for example, a router reflector module. In some embodiments, the compute device 400 can be, for example, a general purpose compute device or compute node that hosts and executes multiple processes, applications, virtual machines, and/or software modules (stored and/or executing in hardware).

Figure 5:
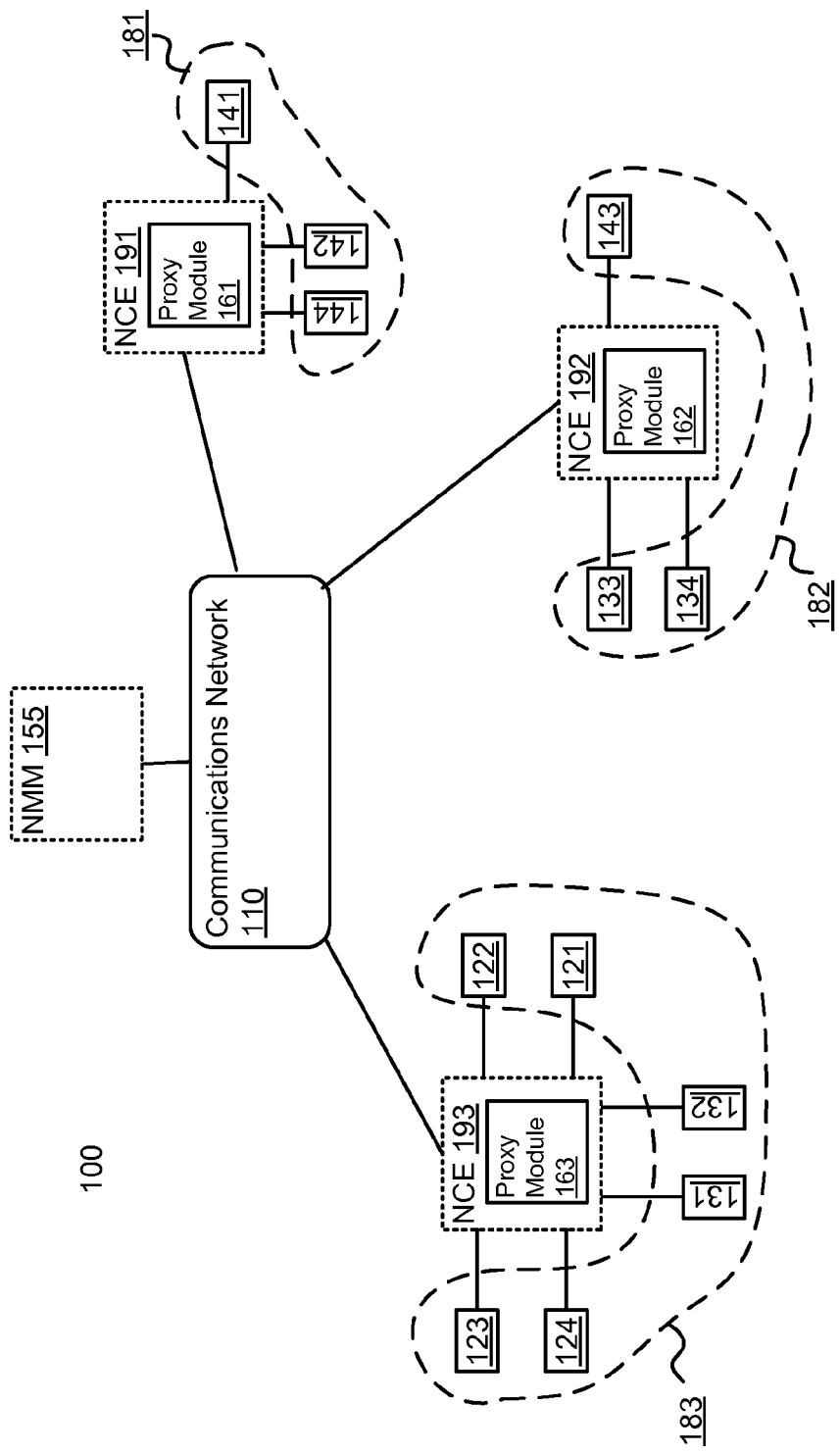
FIG. 5 is a schematic illustration of a logical topology of the control plane of the switch fabric system shown in FIG. 1.

FIG. 5 is a schematic illustration of a logical topology of the control plane of the switch fabric system 100 shown in FIG. 1. As shown in FIG. 5 and described with respect to FIG. 1, the network control entities 191-193 are operatively coupled to the network management module 155, and such connections can be through a control plane portion of the communications network 110. The network control entities 191, 192 and 193 are associated with proxy modules 161, 162 and 163, respectively. The proxy modules 161-163 are structurally and functionally similar to the proxy module 354 of the access switch 300 in FIG. 3. Furthermore, the network management module 155, the network control entities 191-193 and the control plane portion of the communications network 110 are within a control plane of the switch fabric system 100.

In some embodiments, the network management module 155 can be configured to access and retrieve information from a network control entity that is operatively coupled to and controlled by the network management module 155. The information retrieved from the network control entity can include data plane information or data, system state information or data, control daemon information, and/or the like. For example, the information can include information associated with a L2 switching table stored at an access switch. For another example, the information can include information associated with a topology of the control plane of the switch fabric system 100. For yet another example, the information can be associated with verifications of route distributions.

In operation, the network management module 155 can send a signal to the network control entity. The signal includes an instruction or command to access and retrieve information from the network control entity. In some embodiments, the signal can be generated by a user logging into the network management module 155 and entering a command through, for example, a control command interface (e.g., a GUI (graphic user interface)) at a user device (e.g., a monitor, keyboard, touch screen, compute device, etc.) associated with the network management module 155. Such a command can include information associated with the requested information and/or the network control entity (or access switch) from which the information is requested. In some embodiments, such a control command interface can be a CLI.

For example, a user logs into a SFC of the compute device 155 using a keyboard and a monitor of the compute device 150. The user then enters a command using the keyboard and the monitor to request an operative status of a route associated with the group of ports 183 controlled by the network control entity 193. For another example, a user enters a command using a touch screen of the compute device 150 to request information associated with a packet error rate (PER) of data transmitted through the port 133 controlled by the network control entity 192.

In response to the signal received at the network control entity, the proxy module associated with that network control entity can be configured to access and retrieve the requested information accordingly. In some embodiments, the proxy module can be configured to access and retrieve information from different components associated with the network control entity using different methods. For example, the proxy module can invoke or generate a Shell command to access and retrieve information (e.g., system state information) stored at a kernel of the access switch that hosts the network control entity. For another example, the proxy module can invoke or generate a VTY command to access and retrieve information (e.g., data plane information) stored at a line card controlled by the network control entity. In such instances, the proxy module can be or function as a VTY proxy daemon. Furthermore, in some instances, the proxy module can login to the network control entity or a component (e.g., a kernel, a line card, a port) of the network control entity using a proxy login to access and retrieve the requested information.

For example, in response to receiving the signal having a request for the status of the route associated with the group of ports 183, the proxy module 163, using a Shell command, can access and retrieve information associated with the request from a memory (e.g., a database) of the access switch 120 that hosts the network control entity 193. For another example, in response to receiving the signal having a request for information associated with the PER of data transmitted through the port 133, the proxy module 162, using a VTY command, can login to a line card (e.g., the line card 310, 320 in FIG. 3) of the access switch 130 that includes the port 133, and then access and retrieve the requested information. After the requested information is retrieved by the proxy module, the proxy module can be configured to send the retrieved information to the network management module 155.

In some embodiments, if the requested information is stored within the network management module 155 or any other component (e.g., a memory) of the compute device 150, the network management module 155 can be configured to access and retrieve the information locally (that is, without interacting with any network control entity controlled by the network management module 155). For example, in response to a command entered by a user, the network management module 155 can be configured to retrieve control plane information stored at the network management module 155 such as a topology of the control plane portion of the communications network 110, an operative status of each network control entity 191-193, and/or the like.

In some embodiments, the network management module 155 can be configured to send a signal to output the retrieved information on a single interface. The retrieved information can include the information retrieved from the network control entity and the information retrieved from the network management module 155. In some embodiments, the single interface can be the control command interface (e.g., a CLI) that is used by the user to enter the command. As a result of the output, the user can view the retrieved information on that single interface. Thus, the user can take actions accordingly based on the retrieved information. Particularly, in some embodiments, the user can debug the compute device 150, the access switch hosting the network control entity, and/or any other component of the switch fabric system 100 through the single interface based on the retrieved information.

In some embodiments, the network management module 155 can be configured to access and retrieve multiple information items (e.g., data plane information) from multiple line cards and/or other components controlled by a network control entity. In such embodiments, the proxy module associated with the network control entity can be configured to access and retrieve the multiple information items from the multiple line cards and/or other components. In some embodiments, the proxy module can be, for example, a VTY proxy daemon that supports multiple sessions for accessing and retrieving data and/or information. In such embodiments, the proxy module can be configured to access and retrieve the multiple information items (substantially) simultaneously using the multiple sessions. In other embodiments, the proxy module can be configured to access and retrieve the multiple information items in a sequential manner using a single session at any given time. For example, in response to receiving a signal requesting information associated with an operative status of each port 141, 142 and 144, the proxy module 161 is configured to execute multiple sessions to access (e.g., using a proxy login) each line card that includes the ports 141, 142 or 144. The proxy module 161 is then configured to retrieve the requested information from each line card (substantially) simultaneously using the multiple sessions.

In some embodiments, after retrieving the multiple information items, the proxy module can be configured to aggregate the multiple information items and then send the aggregated multiple information items to the network management module 155. In response to receiving the aggregated multiple information items, the network management module 155 can be configured to send a signal to output the multiple information items on the single interface, similar to the method described above.

In some embodiments, the network management module 155 can be configured to access and retrieve information from multiple network control entities that are operatively coupled to and controlled by the network management module 155. In such embodiments, based on a command requesting multiple information items from multiple network control entities, the network management module 155 can be configured to send a signal to each of the multiple network control entities, such that each proxy module associated with one of the multiple network control entities can access and retrieve the requested information at that network control entity accordingly. Particularly, the network management module 155 can execute multiple sessions to access and retrieve information from the multiple network control entities (substantially) simultaneously. Thus, the network management module 155 does not need to repeat executing the same (or substantially the same) operations sequentially for each network control entity.

With the capabilities of interacting with multiple network control entities substantially simultaneously and operating on multiple information items substantially simultaneously at each network control entity as described above, the network management module 155 can be configured to select multiple network control entities and retrieve multiple information items from the selected network control entities by a single command. For example, a user can enter a single command at a CLI associated with the network management module 155, requesting (1) information associated with the control plane of the communications network 110, (2) verification of a route distribution associated with the network control entity 193, (3) a PER associated with each port from the group of ports 181. In response to the single command, the network management module 155 can execute multiple sessions substantially simultaneously to access and retrieve each of the requested information. Specifically, the network management module 155 can locate and retrieve the information associated with the control plane of the communications network 110 that is stored at the network management module 155. The network management module 155 can send a signal to the network control entity 193 such that the proxy module 163 access and retrieves information of the verification of the route distribution associated with the network control entity 193. The network management module 155 further can send a signal to the network control entity 191 such that the proxy module 161 executes three sessions to access the port 141, the port 142 and the port 144 substantially simultaneously; as a result, the proxy module 161 retrieves information associated with the PER for each port 141, 142 and 144. The proxy module 163 and the proxy module 161 can send the retrieved information to the network management module 155. Each of the requested information (from the network control entities and the network management module 155) is output on the CLI, thus received or viewed by the user within a single session or within a single report or screen.

In some embodiments, the network management module 155 can be configured to access and retrieve information from a switch module (not shown in FIG. 5; e.g., a first stage module, a second stage module, etc.) of the distributed switch fabric included in or associated with the communications network 110. Similar to the method described above for accessing and retrieving information from a network control entity, the network management module 155 can be configured to send a signal to the switch module such that a proxy module at (or associated with) the switch module accesses information associated with the switch module. The network management module 155 can be configured to receive the information associated with the switch module from the proxy module (via the distributed switch fabric). The network management module 155 can then be configured to send a signal to output, on the single interface, the information associated with the switch module.

Figure 6:
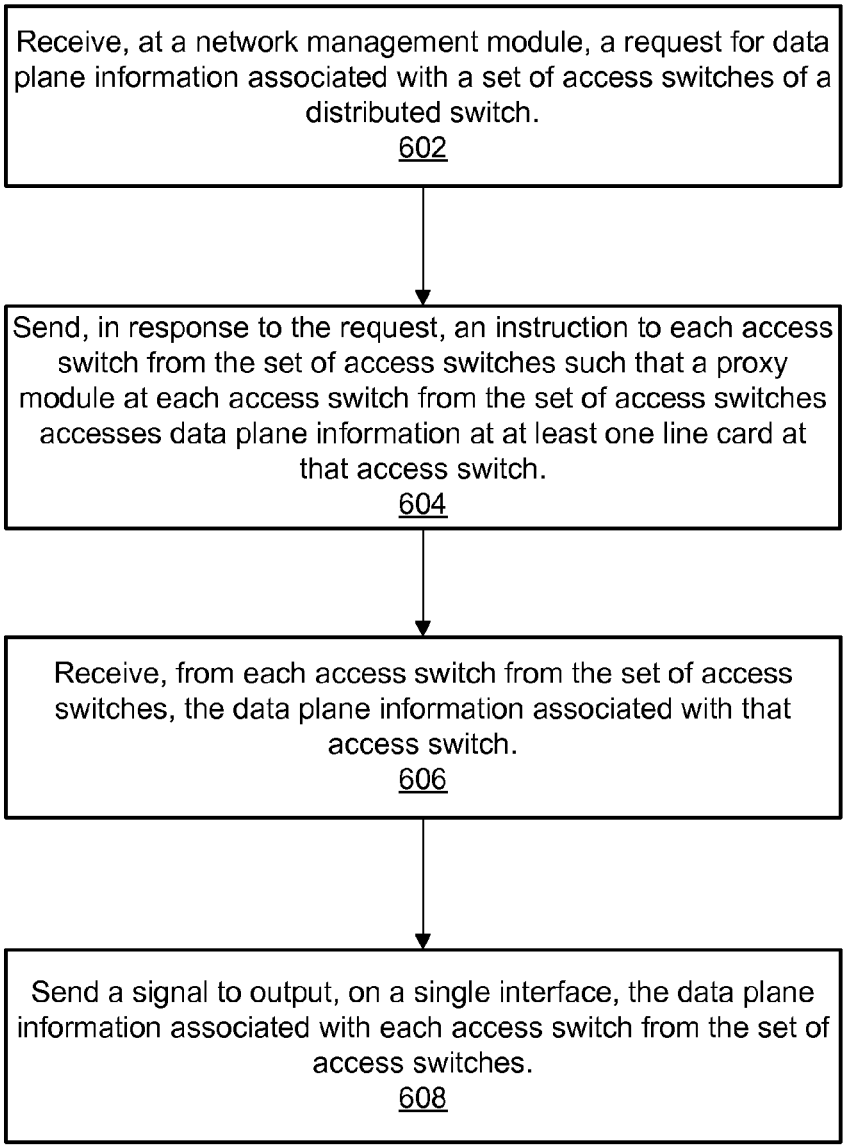
FIG. 6 is a flow chart illustrating a method for retrieving information from a set of access switches, according to an embodiment.

FIG. 6 is a flow chart illustrating a method 600 for retrieving information from a set of access switches, according to an embodiment. The method 600 can be performed at a network management module that is structurally and functionally similar to the network management module 155 shown and described with respect to FIGS. 1 and 5. Particularly, the network management module can be hosted and executed at a compute device similar to the compute device 150 in FIG. 1. Instructions associated with performing the method 600 can be stored within a non-transitory processor-readable medium (e.g., in a memory) associated with the network management module (e.g., the memory 420 of the compute device 400 in FIG. 4), and executed by a processor associated with the network management module (e.g., the processor 410 of the compute device 400 in FIG. 4). Furthermore, similar to the network management module 155 in FIGS. 1 and 5, the network management module performing the method 600 can be associated with a distributed switch (e.g., the switch fabric system 100 in FIG. 1) and operatively coupled to a set of access switches (e.g., the access switches 120, 130 and 140 in FIG. 1).

The method 600 includes receiving a request for data plane information associated with the set of access switches of the distributed switch, at 602. Such a request can be received as, for example, a command entered by a user on a control command interface (e.g., a CLI) associated with the network management module. In some embodiments, the data plane information can include information associated with switching data traffic at the set of access switches such as, for example, a L2 switching table. In some embodiments, the data plane information can be associated with a line card (e.g., the line card 310, 320 in FIG. 3) or a port (e.g., the port 311, 312, 321, 322 in FIG. 3) at each access switch from the set of access switches.

At 604, in response to the request, the network management module can be configured to send an instruction to each access switch from the set of access switches such that a proxy module (e.g., the proxy module 161, 162, 163 in FIG. 5) at each access switch from the set of access switches accesses data plane information at one or more line cards at that access switch. In some embodiments, the proxy module at each access switch can be a VTY proxy daemon. In such embodiments, the proxy module can be configured to access the line card(s) at the access switch using, for example, a proxy login. Furthermore, the proxy module can be configured to execute multiple sessions to access multiple line cards (substantially) simultaneously.

At 606, the network management module can be configured to receive, from each access switch from the set of access switches, the data plane information associated with that access switch. Specifically, the proxy module at the access switch can be configured to retrieve the requested information from the line card(s) of the access switch, and then send the retrieved information to the network management module. In some embodiments, the proxy module can be configured to aggregate multiple information items that are retrieved from multiple line cards, and then send the aggregated multiple information items to the network management module.

At 608, the network management module can be configured to send a signal to output, on a single interface (e.g., the CLI), the data plane information associated with each access switch from the set of access switches. Furthermore, in some embodiments, the network management module can be configured to access control plane data stored at the network management module. In such embodiments, the network management module can be configured to send the signal to output the control plane data on the single interface with the data plane information associated with each access switch from the set of access switches.

In some embodiments, the network management module can be configured to send a signal to, for example, a first stage module of the distributed switch such that a proxy module at the first stage module accesses data plane information associated with the first stage module. As a result, the network management module can be configured to receive the data plane information associated with the first stage module from the first stage module. Furthermore, the network management module can be configured to send the signal to output the data plane information associated with the first stage module on the single interface, along with other retrieved information as described above.

In some embodiments, the network management module can be configured to retrieve other information from other devices and/or modules within the distributed switch, in a method similar to the method 600 described above. For example, the network management module can be configured to retrieve system state information from a set of network control entities, each of which is included in an access switch from the set of access switches. Specifically, the network management module can be configured to receive a request for system state information. In response to such a request, the network management module can be configured to send an instruction to each network control entity from the set of network control entities. As a result, the network management module can be configured to receive system state information from each network control entity from the set of network control entities. Furthermore, the network management module can be configured to send a signal to output, on the single interface, the system state information from each network control entity from the set of network control entities, along with the data plane information associated with each access switch from the set of access switches as described above.

Although some embodiments are described above with respect to FIG. 5 as various types of commands (e.g., Shell commands, VTY commands) being generated and/or invoked at proxy modules associated with network control entities, in other embodiments, the various types of commands can be generated at the network management module. In such embodiments, a user can provide a single command to the network management module, which includes a request for different types of information from different components or modules (e.g., line cards, ports, kernels) of multiple devices (e.g., access switches, switch modules) within the switch fabric system. In response to the single command, the network management module can be configured to generate different types of commands, and then send the different types of commands to the corresponding devices. The different types of commands can be executed by, for example, proxy modules associated with the devices. As a result, the different types of information is accessed and retrieved from the different components or modules of the multiple devices. For example, the network management module can be configured to generate a Shell command to access and retrieve information (e.g., system state information) stored at a kernel of an access switch. For another example, the network management module can be configured to generate a VTY command to access and retrieve information (e.g., data plane information) stored at a line card controlled by a network control entity.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code. Such computer code can also be referred to as a computer program and some embodiments can be in the form of a computer program.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive, at a network management module, a request for first data plane information and second data plane information associated with a plurality of access switches of a distributed switch;
   send, in response to the request, an instruction to each access switch from the plurality of access switches such that a proxy module at each access switch from the plurality of access switches (1) accesses first data plane information at a first line card at that access switch, (2) accesses second data plane information at a second line card at that access switch, and (3) aggregates the first data plane information and the second data plane information to produce aggregated data plane information prior to sending the first data plane information and the second data plane information to the network management module;
   receive, from each access switch from the plurality of access switches, the aggregated data plane information associated with that access switch; and
   send a signal to output, on a single interface, the aggregated data plane information associated with each access switch from the plurality of access switches.

2. The non-transitory processor-readable medium of claim 1, further comprising code to cause the processor to:
   access control plane data stored at the network management module, the code to cause the processor to send the signal to output includes code to cause the processor to send the signal to output the control plane data on the

19 single interface with the aggregated data plane information associated with each access switch from the plurality of access switches.

3. The non-transitory processor-readable medium of claim 1, further comprising code to cause the processor to:
   receive, at the network management module, a request for system state information;
   send, in response to the request for system state information, an instruction to each network control entity from a plurality of network control entities; and
   receive system state information from each network control entity from the plurality of network control entities,
   the code to cause the processor to send the signal to output includes code to cause the processor to send the signal to output the system state information from each network control entity from the plurality of network control entities on the single interface with the aggregated data plane information associated with each access switch from the plurality of access switches.

4. The non-transitory processor-readable medium of claim 1, wherein the single interface is a command line interface (CLI).

5. The non-transitory processor-readable medium of claim 1, wherein the proxy module at each access switch from the plurality of access switches is a Virtual Teletype Terminal (VTY) proxy daemon.

6. The non-transitory processor-readable medium of claim 1, wherein the first data plane information associated with each access switch from the plurality of access switches includes at least one layer-2 (L2) switching table.

7. The non-transitory processor-readable medium of claim 1, further comprising code to cause the processor to:
   send a signal to a first stage module of the distributed switch such that a proxy module at the first stage module accesses data plane information associated with the first stage module; and
   receive the data plane information associated with the first stage module from the first stage module,
   the code to cause the processor to send the signal to output includes code to cause the processor to send the signal to output the data plane information associated with the first stage module on the single interface.

8. An apparatus, comprising:
   a network management module implemented in at least one of a memory or a processing device, the network management module configured to be associated with a distributed switch having a plurality of network control entities at a plurality of access switches, the network management module configured to be operatively coupled to each network control entity from the plurality of network control entities, the network management module configured to send a signal to a network control entity from the plurality of network control entities at an access switch from the plurality of access switches such that a proxy module at that access switch (1) accesses first data plane information from a first line card, (2) accesses second data plane information from a second line card, and (3) aggregates the first data plane information and the second data plane information to produce aggregated data plane information prior to sending the first data plane information and the second data plane information to the network management module, the first line card and the second line card being controlled by that network control entity and physically located at that access switch,
   the network management module configured to receive the aggregated data plane information in response to the proxy module aggregating the first data plane information and the second data plane information, the network management module configured to send a signal to output on a single interface (1) control plane data stored at the network management module and (2) the aggregated data plane information.

9. The apparatus of claim 8, wherein the network control entity is a first network control entity from the plurality of network control entities, the access switch is a first access switch from the plurality of access switches,
   the network management module configured to send the signal to the first network control entity such that the proxy module at the first access switch accesses, during a first time period, the first data plane information at the first line card physically located at the first access switch,
   the network management module configured to send a signal to a second network control entity from the plurality of network control entities at a second access switch from the plurality of access switches such that a proxy module at the second access switch accesses, during a second time period at least partially overlapping the first time period, third data plane information at a third line card controlled by the second network control entity and physically located at the second access switch,
   the network management module configured to receive the third data plane information from the third line card at the second access switch in response to the proxy module at the second access switch accessing the third data plane information at the third line card at the second access switch, the network management module configured to send a signal to output, on the single interface, the third data plane information received from the third line card at the second access switch.

10. The apparatus of claim 8, wherein the network management module is configured to receive, from the network control entity and in response to the signal sent from the network management module to the network control entity, system state data stored at the network control entity,
    the network management module configured to send a signal to output, on the single interface, the system state data.

11. The apparatus of claim 8, wherein the network management module is configured to send a signal to a first stage module of the distributed switch such that a proxy module at the first stage module accesses data plane information associated with the first stage module, the network management module configured to receive the data plane information associated with the first stage module from the first stage module, the network management module configured to send a signal to output, on the single interface, the data plane information associated with the first stage module.

12. The apparatus of claim 8, wherein the single interface is a command line interface (CLI).

13. The apparatus of claim 8, wherein the proxy module is a Virtual Teletype Terminal (VTY) proxy daemon.

14. The apparatus of claim 8, wherein the first data plane information includes at least one layer-2 (L2) switching table.

15. An apparatus, comprising:
    a proxy module associated with a network control entity at an access switch, the access switch configured to be included within a plurality of access switches of a distributed switch, the proxy module configured to be operatively coupled to a management module at a compute device different from the access switch, the proxy module configured to receive, from the management module, a signal requesting first data plane information from a first line card at the access switch and a signal requesting second data plane information from a second line card at the access switch, the proxy module configured to access the first data plane information from the first line card using a proxy login to the first line card and to access the second data plane information from the second line card using a proxy login to the second line card, the proxy module configured to aggregate the first data plane information and the second data plane information to produce aggregated data plane information prior to sending the first data plane information and the second data plane information to the management module, the proxy module configured to send the aggregated data plane information to the management module such that the management module sends a signal to output on a single interface the aggregated data plane information with control plane data stored at the management module.

16. The apparatus of claim 15, wherein the proxy login to the first line card is a proxy Virtual Teletype Terminal (VTY) login.

17. The apparatus of claim 15, wherein the proxy module is a Virtual Teletype Terminal (VTY) proxy daemon.

18. The apparatus of claim 15, wherein the first data plane information includes at least one layer-2 (L2) switching table.

19. The apparatus of claim 15, wherein the proxy module is configured to send the first data plane information to the management module such that the management module sends a signal to output on the single interface the first data plane information, the control plane data and system state data retrieved from the network control entity.

* * * * *